(12) United States Patent
Qin et al.

(10) Patent No.: US 10,733,126 B2
(45) Date of Patent: Aug. 4, 2020

(54) FPGA-BASED SQUARE-WAVE GENERATOR AND SQUARE-WAVE GENERATION METHOD

(71) Applicant: University of Science and Technology of China, Hefei, Anhui (CN)

(72) Inventors: Xi Qin, Hefei (CN); Yijin Xie, Hefei (CN); Xing Rong, Hefei (CN); Yu He, Hefei (CN); Lin Wang, Hefei (CN); Zhifu Shi, Hefei (CN); Jiangfeng Du, Hefei (CN)

(73) Assignee: University of Science and Technology of China, Hefei (CN)

( * ) Notice: Subject to any disclaimer, the term of this patent is extended or adjusted under 35 U.S.C. 154(b) by 204 days.

(21) Appl. No.: 16/070,774

(22) PCT Filed: Jan. 18, 2016

(86) PCT No.: PCT/CN2016/071182
§ 371 (c)(1),
(2) Date: Nov. 5, 2018

(87) PCT Pub. No.: WO2017/124219
PCT Pub. Date: Jul. 27, 2017

(65) Prior Publication Data
US 2019/0196999 A1   Jun. 27, 2019

(51) Int. Cl.
*G06F 13/38* (2006.01)
*G06F 1/14* (2006.01)
*G04F 10/00* (2006.01)

(52) U.S. Cl.
CPC .......... *G06F 13/387* (2013.01); *G04F 10/00* (2013.01); *G06F 1/14* (2013.01); *G06F 13/38* (2013.01)

(58) Field of Classification Search
CPC . G06F 1/14; G06F 10/00; G06F 13/38; G06F 13/387
See application file for complete search history.

(56) References Cited

U.S. PATENT DOCUMENTS 4,468,746 A   8/1984   Davis
5,252,867 A   10/1993  Sorrells et al.

FOREIGN PATENT DOCUMENTS

CN   101478308 A   7/2009
CN   201409126 Y   2/2010
(Continued)

OTHER PUBLICATIONS

International Search Report dated Oct. 19, 2016 in connection with Application No. PCT/CN2016/071182.
(Continued)

*Primary Examiner* — Getente A Yimer
(74) *Attorney, Agent, or Firm* — Wolf, Greenfield & Sacks, P.C.

(57) ABSTRACT

An FPGA-based square-wave generator and a square-wave generation method. The generator comprises a bus control module for receiving a broadcast command and a broadcast address sent by an upper computer; a waveform broadcast management module for receiving the broadcast command and the broadcast address, reading original waveform data from a storage module according to the broadcast command and the broadcast address, decoding the original waveform data to obtain waveform data, generating delay data according to the waveform data, and outputting the waveform data and the delay data; a parallel-serial conversion unit for receiving waveform data input in parallel and serially outputting the waveform data to obtain a square-wave signal; a delay chain unit for delaying the square-wave signal; and a multi-path selection controller for receiving the delay data, determining an output node, for the square-wave signal, on (Continued)

the delay chain unit according to the delay data, and leading out a corresponding delayed square-wave signal from the output node and outputting the signal. By means of the present invention, square-wave signals with high accuracy and no dead time can be continuously output.

10 Claims, 3 Drawing Sheets

(56) References Cited

FOREIGN PATENT DOCUMENTS

| CN | 102447477 A | 5/2012 |
|---|---|---|
| CN | 104597748 A | 5/2015 |
| CN | 105162437 A | 12/2015 |
| CN | 105718404 A | 6/2016 |

OTHER PUBLICATIONS

Extended European Search Report for European Application No. 16885492.5, dated Aug. 13, 2019.

FPGA-BASED SQUARE-WAVE GENERATOR AND SQUARE-WAVE GENERATION METHOD

CROSS REFERENCE TO RELATED APPLICATIONS

This Application is a national stage filing under 35 U.S.C. 371 of International Patent Application Serial No. PCT/CN2016/071182, filed Jan. 18, 2016, the entire contents of which is incorporated herein by reference in its entirety.

TECHNICAL FIELD

The present disclosure relates to the technical field of square wave generation, and in particular, to a square wave generator and a method for generating a square wave based on a Field Programmable Gate Array (FPGA).

BACKGROUND

With rapid development of electronic science and technology and related research fields in recent years, square wave generators have been widely applied in fields of electronic science and technology, communications, physics, chemistry, biology, and even medical science. Square waves with high-speed and high-precision can be applied to situations such as ultrasonic, radar, medical imaging, communications, and laser control, and to frontier scientific research fields such as electron paramagnetic resonance, nuclear magnetic resonance, and mass spectrometry. With rapid development of modern science and technology and experimental methods, there are new requirements on square waves generating function with high-speed and high-precision.

In conventional technology, two common solutions are applied to generate the square waves with high-speed and high-precision. One solution is combining an FPGA and high-speed serialization technology, and a resolution of the square wave may be controlled to be 2 ns by using a high-speed clock. Generally, a (Double Date Rate) DDR is adopted to store waveform data, and communication with a master computer for transmitting a waveform parameter is achieved via an Ethernet or a PCI bus. The digital logics of the FPGA reads the waveform parameters from the DDR, and outputs a waveform by using the high-speed serialization technology after completing the waveform analysis. According to the above solution, square waves generating function with a high speed can be achieved, but the square wave only has a precision with an order of magnitude of nanosecond (ns), and thus failing to meet a requirement of high precision. Meanwhile, a minimum limit of a width of the square wave is 12 ns according to a waveform data storage framework based on DDR3. Another solution is using a DTC (Digital to Time Convert, digital-to-time converter) based on a vernier caliper method or a high-performance delay PLL (Phase Locked Loop), with which a time precision of picosecond or even sub-picosecond can be achieved. However, although square wave pulses with high precision can be outputted, there are some limitations for the high-precision DTC based on the vernier caliper method or based on the PLL. For example, a maximum width of an outputted pulse is limited, and a dead time of the output pulse is long, where the dead time can even reach microseconds.

Therefore, an issue for those skilled in the art to address is to provide a square wave generator which can continuously output the square wave with high precision, large dynamic range and low dead time and to provide a method for generating the square wave.

SUMMARY

An objective of the present disclosure is to provide a square wave generator based on an FPGA, based on which a square wave signal having high precision and no dead time can be continuously outputted. Another objective of the present disclosure is to provide a method for generating a square wave based on an FPGA.

To address the above technical issues, a square wave generator based on an FPGA is provided according to the present disclosure, including:
a bus control module, configured to receive a playing instruction and a playing address which are sent by a master computer, and output the playing instruction and the playing address;
a waveform playing management module, configured to receive the playing instruction and the playing address, read raw waveform data from a storage module according to the playing instruction and the playing address, decode the raw waveform data to obtain waveform data, generate delay data according to the waveform data, and output the waveform data and the delay data;
a parallel-in serial-out conversion unit, configured to receive the waveform data inputted in parallel, and output the waveform data in serial to obtain a square wave signal;
a delay chain unit, configured to delay the square wave signal; and
a multiplex controller, configured to receive the delay data, determine an output node of the square wave signal on the delay chain unit according to the delay data, obtain a delayed square wave signal corresponding to the output node from the output node, and output the delayed square wave signal.

Preferably, the parallel-in serial-out conversion unit is specifically configured to receive, according to a system clock, the waveform data inputted in parallel, and output in serial, according to a high-speed clock, the square wave signal in a DDR manner, where a frequency of the high-speed clock is 4 times as large as a frequency of the system clock.

Preferably, the delay data includes a relationship t indicating an arrival time of signal edge of the square wave signal, where:

$$t = n_1 * \frac{T}{2} + n_2 * t_0;$$

$n_1$ represents total time duration of square wave signals before a current square wave signal arrives;
T represents a period of the high-speed clock;
$n_2$ represents a sequence number of the output node for outputting a signal in the delay chain unit;
$t_0$ represents a delay time of a single delay unit in the delay chain unit; and
where a total delay time of the delay chain unit is not shorter than the period of the high-speed clock.

Preferably, $$\frac{T}{2} = \left(n + \frac{1}{2}\right) * t_0,$$

where n represents a positive integer.

Preferably, n is 12 and $t_0$ is 50 ps.

Preferably, the storage module is specifically configured to receive, via the bus control module, a storage command, a storage address, and the raw waveform data, which are sent by the master computer, decode the storage address based on the storage command, and store the raw waveform data according to a decoded storage address.

Preferably, each square wave signal of the raw waveform data occupies 80 bits data in the storage module, a first group of 32 bits in the 80 bits contains information of holding a high level in the each square wave signal, a second group of 32 bits in the 80 bits contains information of holding a low level in the each square wave signal, a third group of 8 bits in the 80 bits contains information of a delay time between a rising edge of the each square wave signal and a clock edge of the high-speed clock, and a fourth group of 8 bits in the 80 bits contains information of a delay time between a falling edge of the each square wave signal and another clock edge of the high-speed clock.

Preferably, the square wave generator further includes:
a clock management module, configured to:
receive a reference clock inputted externally,
generate, according to the reference clock, an operating clock for the bus control module, the waveform playing management module, the parallel-in serial-out conversion unit, and the multiplex controller, where the operating clock is the system clock, and
generate the high-speed clock for the parallel-in serial-out conversion unit according to the reference clock.

Preferably, the bus control module is a USB (Universal Serial Bus) control module.

To address the above technical issue, a method for generating a square wave based on an FPGA is also provided according to the present disclosure, including:
receiving a playing instruction and a playing address which are sent by a master computer, and outputting the playing instruction and the playing address;
receiving the playing instruction and the playing address; reading, according to the playing instruction and the playing address, raw waveform data from a storage module; decoding the raw waveform data to obtain waveform data; generating delay data according to the waveform data; and outputting the waveform data and the delay data;
receiving the waveform data inputted in parallel, and outputting the waveform data in serial to obtain a square wave signal;
delaying the square wave signal; and
receiving the delay data, determining, according to the delay data, an output node of the square wave signal on a delay chain unit, obtaining a delayed square wave signal corresponding to the output node from the output node, and outputting the delayed square wave signal.

The square wave generator and the method for generating the square wave based on an FPGA are provided according to the present disclosure. In the generator, the parallel-in serial-out conversion unit outputs the square wave signal to the delay chain unit, the delay chain unit delays the square wave signal, the multiplex controller receives the delay data and determines the output node of the square wave signal on the delay chain unit according to the delay data, and the multiplex controller obtains the corresponding delayed square wave signal from the output node and outputs the delayed square signal. Time interpolation is performed on the high-speed clock by using a delay chain. A high-time resolution of the square wave signal is improved while retaining the high-speed characteristic, and a capability to output the square wave without dead time is ensured.

BRIEF DESCRIPTION OF THE DRAWINGS

For a clearer illustration of the technical solutions according to embodiments of the present disclosure, drawings used in the description of the embodiments are introduced briefly hereinafter. Apparently, the drawings described hereinafter merely illustrate some embodiments of the present disclosure, and other drawings may be obtained by those skilled in the art based on the provided drawings without creative efforts.

DETAILED DESCRIPTION OF THE EMBODIMENTS

An objective of the present disclosure is to provide a square wave generator based on an FPGA, which can continuously output a square wave signal with high precision and without a dead time. Another objective of the present disclosure is to provide a method for generating a square wave based on an FPGA.

To make the objective, technical solutions and advantages of the present application clearer, the technical solutions according to the embodiments of the present application will be described clearly hereinafter in conjunction with the drawings for the embodiments of the present application. Apparently, only some embodiments rather than all embodiments, are described hereinafter. Any other embodiments obtained by those skilled in the art based on the embodiments in the present disclosure without any creative efforts fall within the protection scope of the present disclosure.

Figure 1:
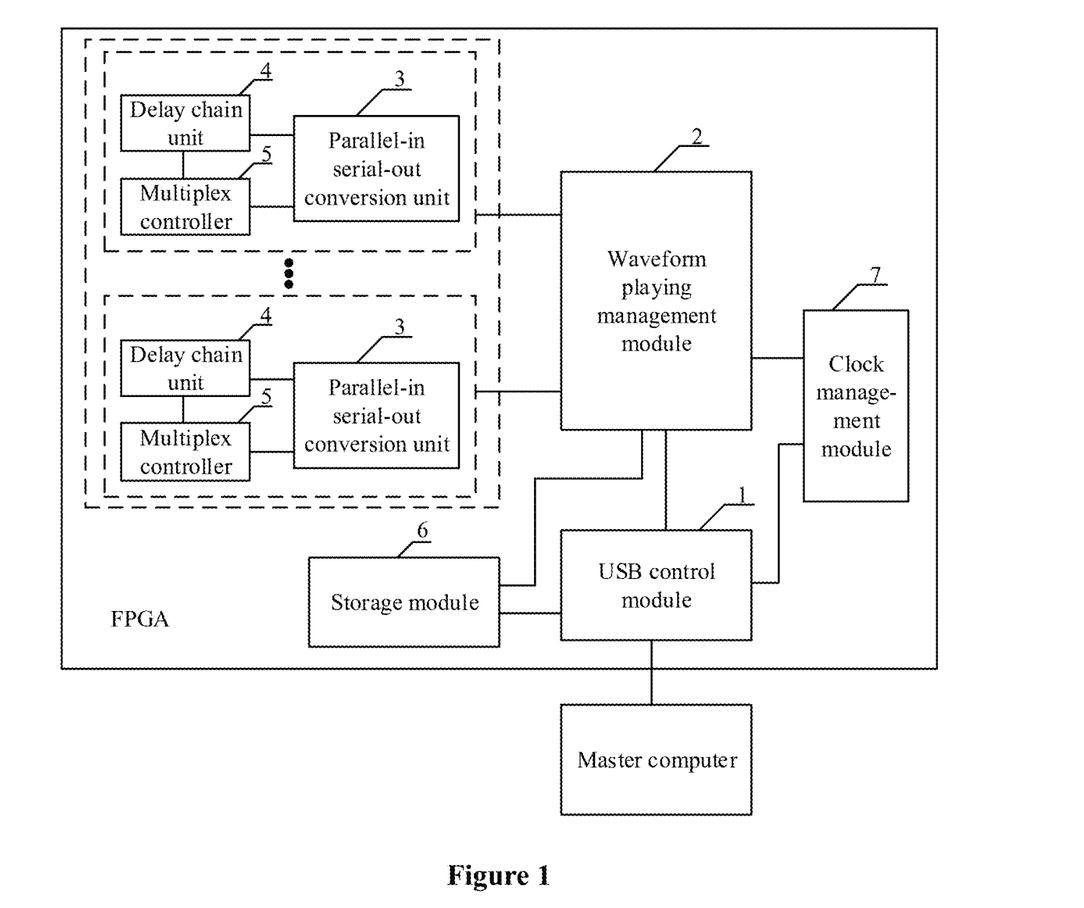
FIG. 1 is a schematic structural diagram of a square wave generator based on an FPGA according to the present disclosure.

Reference is made to FIG. 1, which is a schematic structural diagram of a square wave generator based on an FPGA according to the present disclosure. The square wave generator includes a bus control module, a waveform playing management module 2, a parallel-in serial-out conversion module 3, a delay chain module 4, and a multiplex controller 5.

The bus control module is configured to receive a playing instruction and a playing address which are sent by a master computer, and output the playing instruction and the playing address.

Preferably, the bus control module is a USB bus control module 1.

It should be noted that the USB bus control module 1 is arranged inside the FPGA, and the USB bus control module 1, which is based on a USB bus, is configured to establish communications between the FPGA and the master computer via the USB bus. The communications includes a downloading and updating of a control command and raw waveform data.

It is understood that the bus control module herein may also be a bus control module of another type, which is not limited by the present disclosure. The bus control modules of other types, which are capable to achieve the objective of the present disclosure, fall within the protection scope of the present disclosure.

The waveform playing management module 2 is configured to receive the playing instruction and the playing address, read the raw waveform data from a storage module 6 according to the playing instruction and the playing address, decode the raw waveform data to obtain a waveform data, generate delay data according to the waveform data, and output the waveform data and the delay data.

Further, the storage module 6 is specifically configured to receive, via the bus control module, a storage command, a storage address, and the raw waveform data which are sent by the master computer, decode the storage address according to the storage command, and store the raw waveform data according to a decoded storage address.

It should be understood that, the master computer is configured to send the storage command, the storage address, and the raw waveform data to the USB bus control module 1 via the USB bus at first, and then the USB bus control module 1 sends the storage command, the storage address, and the raw waveform data to the storage module 6. The storage module 6 decodes the storage address, and then stores the raw waveform data into the storage module 6 according to the decoded storage address.

Figure 2:
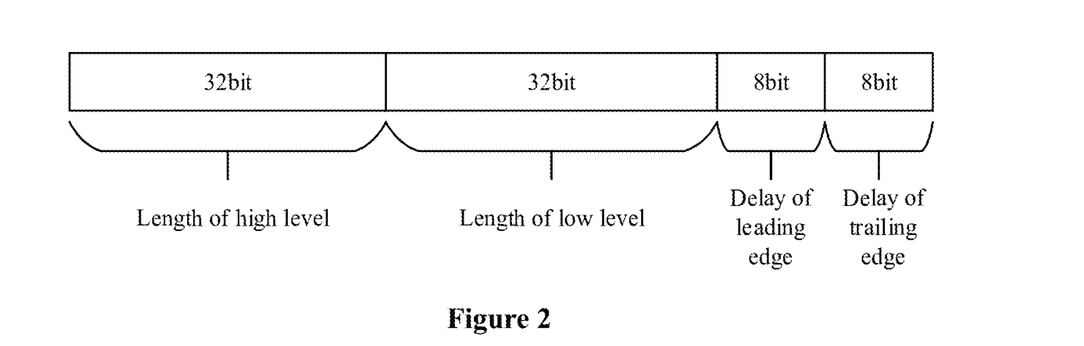
FIG. 2 is a schematic diagram of a storage structure of a square wave signal according to the present disclosure.

Preferably, each square wave signal in the raw waveform data occupies 80 bits in the storage module 6, where a first group of 32 bits in the 80 bits contains information of holding a high level in the each square wave signal, a second group of 32 bits in the 80 bits contains information of holding a low level in the each square wave signal, a third group of 8 bits in the 80 bits contains information of a delay time between a rising edge of the each square wave signal and a clock edge of the high-speed clock, and a fourth group of 8 bits in the 80 bits contains information of a delay time between a falling edge of the each square wave signal and another clock edge of the high-speed clock.

Specifically, reference is made to FIG. 2, which is a schematic diagram of a storage structure of a square wave signal according to the present disclosure.

The raw waveform data of the square wave with high precision is stored in the storage module 6 inside the FPGA. Data of each square wave signal in the raw waveform data is stored in the storage module 6 based on the structure shown in FIG. 2. For the raw waveform data with high precision of the square wave generator, the effective information is: a time duration for holding the high level (a logic "1"), a time duration for holding the low level (a logic "0"), and delay times for the rising edge and the falling edge of the square wave in relative to the clock edge of the high-speed clock. The each square wave signal occupies a total of 80 bits of data. In the 80 bits, a first group of 32 bits contains information on holding the high level (i.e. the logic "1") in the each square wave signal, a second group of 32 bits contains information on holding the low level (i.e. the logic "0") in the each square wave signal, and a period T of the high-speed clock is represented by a lowest bit of these two groups of 32 bits. The information on the delay time between the rising edge of the each square wave signal and the clock edge of the high-speed clock, i.e., a delay of a leading edge as shown in FIG. 2 occupies the third group of 8 bits, and the information on the delay time between the falling edge of the each square wave signal and another clock edge of the high-speed clock, i.e., a delay of a trailing edge as shown in FIG. 2 occupies the fourth group of 8 bits, and a delay time of a single delay unit in the delay chain unit 4 is represented by a lowest bit of these two groups of 8 bits.

Preferably, the delay data includes a relationship t indicating an arrival time of signal edge of the square wave signal, where:

$$t = n_1 * \frac{T}{2} + n_2 * t_0$$

$n_1$ represents a total time duration of square wave signals before a current square wave pulse signal arrives.

T represents the period of the high-speed clock.

$n_2$ represents a sequence number of the output node for outputting a signal in the delay chain unit 4.

$t_0$ represents the delay time of the single delay unit in the delay chain unit 4.

A total delay time of the delay chain unit 4 is not shorter than the period of the high-speed clock.

It can be understood that the relationship t indicating an arrival time of signal edge of the square wave signal is determined by two factors. One factor is time data of parallel input with relatively low precision, which is set as $$n_1 * \frac{T}{2},$$

where $n_1$ represents total time duration of square wave signals before the current square wave signal arrives, and is determined by the sum of a high-level time and a low-level time. The other factor is a delay time of a signal edge of the current square wave signal, where $n_2$ represents the sequence number of the outputting node for outputting a signal in the delay chain unit, and $t_0$ represents the delay time of the single delay unit, so that $$t = n_1 * \frac{T}{2} + n_2 * t_0$$

is obtained. By precisely setting both arrival time of the leading edge and the trailing edge of the square wave signal, a relative delay and a pulse width of the square wave can be precisely adjusted. According to this relationship, a minimum adjustable precision of the square wave is $t_0$, in a case that $t_0$ is much shorter than T. In addition, the total time duration of the delay chain should cover at least the period T of the high-speed clock.

Therefore, a time interpolation for the high-speed clock is realized by using the parallel-in serial-out conversion unit 3 in the FPGA in conjunction with the delay chain unit 4, so that a time resolution that is equal to the delay time of the single delay unit in the delay chain unit 4 is obtained.

Further, $$\frac{T}{2} = \left(n + \frac{1}{2}\right) * t_0,$$

where n represents a positive integer.

The period T of the high-speed clock inputted into the parallel-in serial-out conversion unit 3 is set to satisfy the equation $$\frac{T}{2} = \left(n + \frac{1}{2}\right) * t_0$$

by setting a clock management module 7 inside the FPGA, and a further optimized design is perform on a structure of the square wave data in conjunction with FPGA logic, so as to double the time resolution of the square wave. $t_0$ represents the delay time of the single delay unit in the delay chain unit 4. For the arrival time of the signal edge of the square wave signal $$t = n_1 * \frac{T}{2} + n_2 * t_0,$$

it can also satisfy a relationship $$t = (n_1 - 1) * \frac{T}{2} + \left(n + n_2 + \frac{1}{2}\right) * t_0.$$

By precisely selecting values of $n_1$ and $n_2$ to let these two value alternately change, the two value are further analyzed and processed in the FPGA in real time, and then sent to a square wave outputting module (including the parallel-in serial-out conversion unit 3, the delay chain unit 4, and the multiplex controlling unit 5) for output. Thereby, a precision $\frac{1}{2} * t_0$ for adjusting the signal edge of the square wave signal is realized. Namely, the time precision of the square wave signal can be doubled by using time interpolation alternately. Meanwhile, a characteristic of an outputting square wave at a high speed is also ensured, without influencing other basic parameters of the square wave generator such as a dead time and a dynamic range.

Preferably, n is 12 and $t_0$ is 50 ps.

It should be understood that, in a case that n is 12 and $t_0$ is 50 ps, T is 1.25 ns and the time resolution is $$\frac{t_0}{2},$$

i.e. 25 ps. Hence, me precision is high.

It should be understood that n and $t_0$ are determined according to a practical implementation, and different values may be set for different square wave generators.

The parallel-in serial-out conversion unit 3 is configured to receive the waveform data inputted in parallel, and output the waveform data in serial to obtain a square wave signal.

Preferably, the parallel-in serial-out conversion unit 3 is configured to receive, according to a system clock, the waveform data inputted in parallel, and output, according to the high-speed clock, the square wave signal in serial in a DDR manner, where a frequency of the high-speed clock is 4 times as large as a frequency of the system clock.

The delay chain unit 4 is configured to delay the square wave signal;

It should be understood that the delay chain unit 4 is capable to achieve high-precision delay on the square wave signal and obtain an output of the square wave signal with high time resolution.

The multiplex controller 5 is configured to receive the delay data, determine an output node of the square wave signal on the delay chain unit 4 according to the delay data, obtain from the output node a delayed square wave signal corresponding to the output node, and output the delayed square wave signal.

Figure 3:
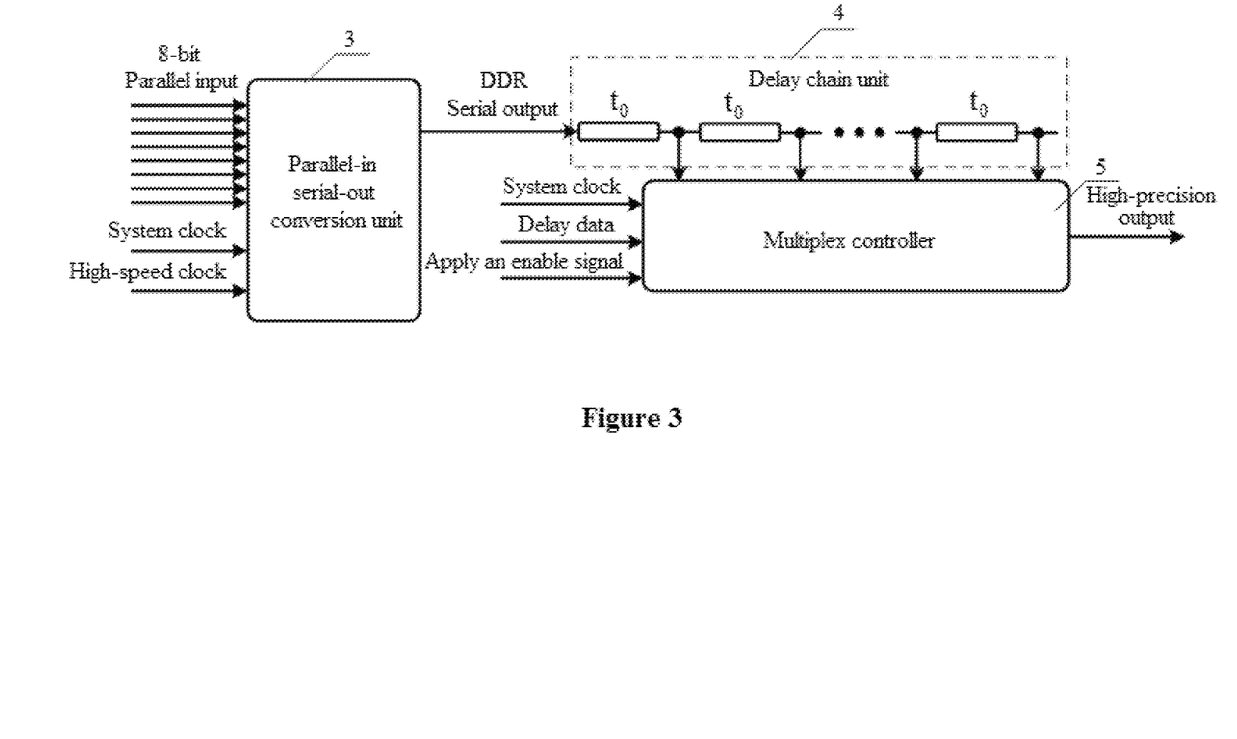
FIG. 3 is a schematic structural diagram of a square wave outputting module according to the present disclosure.

Specifically, reference is made to FIG. 3, which is a schematic structural diagram of a square wave outputting module according to the present disclosure.

It can be understood that the square wave outputting module herein includes the parallel-in serial-out conversion unit 3, the delay chain unit 4, and the multiplex controller 5. Moreover, multiple square wave outputting modules may be included in the square wave generator. A specific quantity of the multiple square wave outputting modules is not limited herein according to the present disclosure.

The square wave outputting module is an important part of the present disclosure. The square wave outputting module is configured to perform time interpolation on the high-speed clock to output the square wave signal having higher time resolution and no dead time. A diagram of an internal structural diagram of the square wave outputting module is shown in FIG. 3. An operating clock of the parallel-in serial-out conversion unit 3 and the multiplex controller 5 is a system clock. The high-speed clock is an output reference clock for the high-speed square wave, and the frequency of the high-speed clock is 4 times as large as the frequency of the system clock. The parallel-in serial-out conversion unit 3 outputs the square wave signal at both the rising edge and the falling edge of the high-speed clock, namely, outputs at a double-rate output (Double Data Rate, DDR). 8-bit parallel waveform data is inputted into the parallel-in serial-out conversion unit 3 according to the system clock. The parallel-in serial-out conversion unit 3 outputs, according to the high-speed clock a square wave signal with 8 bits per period of the system clock in the DDR manner. The square wave signal outputted in serial by the parallel conversion unit 3 is sent to the delay chain unit 4. The multiplex controller 5 determines, according to the inputted delay data in real time, a sequence number of the output node of the delay chain unit 4, obtains a delayed square wave signal corresponding to the output node from the output node, and outputs the delayed square wave signal. Different output nodes in the delay chain correspond to different delays. By the time interpolation using a delay time chain method, the time precision of the square wave is equal to the time delay $t_0$ of the single delay unit in the delay chain unit 4. In this embodiment, a square wave with high precision can be generated. Meanwhile, the capability to output a sequence of square wave at a high speed is ensured, where the square wave has no dead time and a dynamic range from nanoseconds to seconds.

Preferably, the square wave generator further comprises a clock management module 7.

The clock management module 7 is configured to receive a reference clock inputted externally, and generate, according to the reference clock, an operating clock for the bus control module, the waveform playing management module 2, the parallel-in serial-out conversion unit 3, and the multiplex controller 5, where the operating clock is the system clock. The clock management module 7 is further configured to generate, according to the reference clock, the high-speed clock for the parallel-in serial-out conversion unit 3.

In addition, it should be noted that the square wave generator provided by the present disclosure is based on the FPGA. The FPGA selected in the present disclosure is a Virtex-7 FPGA of an SRAM type. The Virtex-7 FPGA is based on a look-up table having six inputs. A 28 nm CMOS process is applied in this FPGA so that more than 10 million gate circuits and thousands of customizable I/O can be integrated into a single chip. The Virtex-7 FPGA has a highest integration and a good performance.

In the present disclosure, the storage module 6, which is generated by calling internal resources of the FPGA, is configured to store the waveform data for the square wave generator having a high-speed and high-precision based on the FPGA. The USB bus control module 1 is arranged inside the FPGA so as to establish communications between the FPGA and the master computer via the USB bus, where the communications includes a downloading and updating of a control command and waveform data. Data decoding, control and state management is performed in a playing process of the square wave waveform by the waveform playing management module 2 using logic resources of the FPGA. A function to output the high-precision square wave is further realized in conjunction with the high-speed parallel-in serial-out conversion unit 3 and the delay chain unit 4 in the FPGA. The clock management module 7 is designed by using clock management resources inside the FPGA. The operating clock for the USB bus control module 1, the memory module 6, the waveform playing management module 2, and the high-speed square wave outputting module (including the parallel-in serial-out conversion unit 3, the delay chain unit 4, and the multiplex controller 5) is generated based on the reference clock which is externally inputted.

It should be understood that the square wave generator based on the Virtex-7 FPGA has the following advantages.

The square wave generator based on the Virtex-7 FPGA is of low cost. A multi-channel superposed waveform generator is achieved by using the Virtex-7 FPGA as a key processing chip. A cost of a single FPGA chip is about 20,000-30,000 Chinese yuan, and a total cost of a single device is about 40,000 Chinese yuan, where this price is equal to the price of a Pulseblaster with a time resolution of mere 1-2 ns. For different implementations, modifications may only be made to logic configurations inside the FPGA, rather than hardware configurations, which can greatly reduce a cost of secondary development.

With the principle of the present disclosure, a square wave generating function having 10 channels with high-speed and high-resolution is achieved in a Virtex-7 FPGA XC7V485T-2 of a SRAM type. The time resolution of the square wave obtained by the time interpolation based on the delay chain can be approximate 50 ps, with no dead time in outputting the square wave and with a dynamic range from 5 ns to seconds. Time precision can be improved to 25 ps by using the time interpolation alternately further.

The square wave generator based on the Virtex-7 FPGA is of high performance and high level of integration. According to the present disclosure, the Virtex-7 FPGA with characteristics of high performance and a high speed are used as a basis of the design. A generating and outputting structure of a digital signal are optimized. Limitations of the conventional technology are broken, and a performance comparable to a customized ASIC can be obtained. Multiple square wave generating channels can be integrated into a single FPGA, which greatly improves an integration level of a system.

According to present disclosure, a square wave generator with high speed, high precision, low cost, strong design flexibility and high integration level is realized based on the Virtex-7 FPGA, which can be applied to many implementations. By using the high performance and re-programmability of the Virtex-7 FPGA, various functions in various implementations can be realized according to this disclosure. The function to generate a high-performance square wave is improved while ensuring flexibility thereof.

The advantages of the square wave generator based on the FPGA according to the present disclosure are described hereinafter.

The square wave generator based on the FPGA has high precision and no dead time. The time interpolation is performed on the high-speed clock by using the delay chain method, which improves the time resolution of the square wave signal while retaining characteristics of continuously outputting the high-precision square wave with a high speed and without the dead time. Using the time interpolation alternately can double the precision of the square wave generator without influencing performance indexes.

The square wave generator based on the FPGA has a large dynamic range. The level holding time of the outputted square wave signal has a very large dynamic range, so that the square wave generator can be applied to various application scenes.

The square wave generator based on the FPGA is of flexibility in implementation. Flexibility is a biggest advantage for a superposed waveform generator based on the FPGA with a high speed and a high resolution. A similar high-performance waveform generator based on a customized ASIC chip generally has limited functions due to a fixed function of the ASIC. It is difficult to adapt to an application scene which requires high flexibility. The square wave generator based on the FPGA greatly utilizes a reprogrammable characteristic of the FPGA. Different requirements can be met by a few modifications to an FPGA code, which does not require any modification on hardware. Development based on the FPGA also simplifies a developing process and difficulties thereof. In addition, the present disclosure is applicable to most application scenes which require the square wave signal due to the characteristics of high precision, no dead time and large dynamic range, and thereby having a good flexibility in application.

Figure 4:
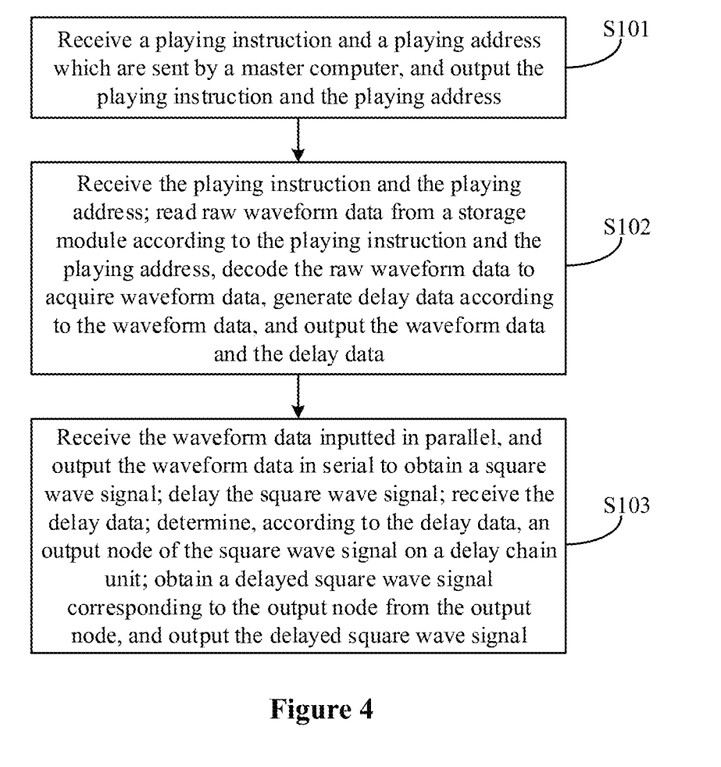
FIG. 4 is a flowchart of a method for generating a square wave based on an FPGA according to the present disclosure.

In order to address the above technical issue, a method for generating a square wave based on an FPGA is further provided according to the present disclosure. Reference is made to FIG. 4, which is a flowchart of a method for generating a square wave based on an FPGA according to the present disclosure. The method includes steps S101 to S103.

In step S101, a playing instruction and a playing address which are sent by a master computer are received, and the playing instruction and the playing address are outputted.

In step S102, the playing instruction and the playing address are received, raw waveform data is read from an storage module according to the playing instruction and the playing address, the raw waveform data is decoded to obtain waveform data, delay data is generated according to the waveform data, and the waveform data and the delay data are outputted.

In step S103, the waveform data inputted in parallel is received, the waveform data is outputted in serial to obtain a square wave signal, the square wave signal is delayed, the delay data is received, an output node of the square wave signal on a delay chain unit is determined according to the delay data, a delayed square wave signal corresponding to the output node is obtained from the output node, and the delayed square wave signal is outputted.

A detailed description of the method for generating the square wave based on the FPGA may be referred to the description of the square wave generator, and is not further described herein.

The method for generating the square wave based on the FPGA is provided according to the present disclosure. The method includes receiving the delay data, determining, according to the delay data, the output node of the square wave signal on the delay chain unit, obtaining the delayed square wave signal corresponding to the output node from the output node, and outputting the delayed square wave signal. Therefore, the precision of the square wave finally outputted by the square wave generator is a delay time of one single delay unit in the delay chain unit. The delay time of the single delay unit in the delay chain unit is as short as picoseconds, so that the square wave signal can be continuously outputted with high precision and no dead time.

It should be noted that, the terms such as "include", "comprise" or any other variants thereof means to be non-exclusive. Therefore, a process, a method, an article or a device including a combination of elements include the disclosed combination of elements, and may further include other elements that are not enumerated, or further include inherent elements of the process, the method, the article or the device. Unless specifically limited, the statement "including/comprising . . . " does not exclude a case that other similar elements may exist in the process, the method, the article or the device other than the combination of elements.

The above description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein, but to the widest scope which is consistent with the principles and novel features disclosed herein.

The invention claimed is:

1. A square wave generator based on a Field Programmable Gate Array (FPGA), comprising:
   a bus control module, configured to receive a playing instruction and a playing address which are sent by a master computer, and output the playing instruction and the playing address;
   a waveform playing management module, configured to receive the playing instruction and the playing address, read raw waveform data from a storage module according to the playing instruction and the playing address, decode the raw waveform data to obtain waveform data, generate delay data according to the waveform data, and output the waveform data and the delay data;
   a parallel-in serial-out conversion unit, configured to receive the waveform data inputted in parallel, and output the waveform data in serial to obtain a square wave signal;
   a delay chain unit, configured to delay the square wave signal; and
   a multiplex controller, configured to receive the delay data, determine an output node of the square wave signal on the delay chain unit according to the delay data, obtain a delayed square wave signal corresponding to the output node from the output node, and output the delayed square wave signal.

2. The square wave generator based on the FPGA according to claim 1, wherein the parallel-in serial-out conversion unit is configured to receive, according to a system clock, the waveform data inputted in parallel, and output in serial, according to a high-speed clock, the square wave signal in a Double Date Rate (DDR) manner; wherein a frequency of the high-speed clock is 4 times as high as a frequency of the system clock.

3. The square wave generator based on the FPGA according to claim 2, wherein the delay data comprises a relationship t indicating an arrival time of signal edge of the square wave signal, wherein $$t = n_1 * \frac{T}{2} + n_2 * t_0,$$

$n_1$ represents a total time duration of square wave signals before a current square wave signal arrives;
T represents a period of the high-speed clock;
$n_2$ represents a sequence number of the output node for outputting a signal in the delay chain unit;
$t_0$ represents a delay time of a single delay unit in the delay chain unit; and
wherein a total delay time of the delay chain unit is not shorter than the period of the high-speed clock.

4. The square wave generator based on the FPGA according to claim 3, wherein $$\frac{T}{2} = \left(n + \frac{1}{2}\right) * t_0,$$

and n represents a positive integer.

5. The square wave generator based on the FPGA according to claim 4, wherein n is 12 and $t_0$ is 50 ps.

6. The square wave generator based on the FPGA according to claim 1, wherein the storage module is configured to receive, via the bus control module, a storage command, a storage address and the raw waveform data which are sent by the master computer, decode the storage address based on the storage command, and store the raw waveform data according to a decoded storage address.

7. The square wave generator based on the FPGA according to claim 1, wherein each square wave signal of the raw waveform data occupies 80 bits in the storage module, wherein a first group of 32 bits in the 80 bits contains information of holding a high level in the each square wave signal, a second group of 32 bits in the 80 bits contains information of holding a low level in the each square wave signal, a third group of 8 bits in the 80 bits contains information of a delay time between a rising edge of the each square wave signal and a clock edge of the high-speed clock, and a fourth group of 8 bits in the 80 bits contains information of a delay time between a falling edge of the each square wave signal and another clock edge of the high-speed clock.

8. The square wave generator based on the FPGA according to claim 1, further comprising:
   a clock management module, configured to:
   receive a reference clock inputted externally;
   generate, according to the reference clock, an operating clock for the bus control module, the waveform playing management module, the parallel-in serial-out conversion unit, and the multiplex controller; wherein the operating clock is the system clock; and
   generate the high-speed clock for the parallel-in serial-out conversion unit according to the reference clock.

9. The square wave generator based on the FPGA according to claim 1, wherein the bus control module is a Universal Serial Bus (USB) bus control module.

10. A method for generating a square wave based on an FPGA, comprising:
   receiving a playing instruction and a playing address which are sent by a master computer, and outputting the playing instruction and the playing address;
   receiving the playing instruction and the playing address; reading, according to the playing instruction and the playing address, raw waveform data from an storage module; decoding the raw waveform data to obtain waveform data; generating delay data according to the waveform data, and outputting the waveform data and the delay data;
   receiving the waveform data inputted in parallel, and outputting the waveform data in serial to obtain a square wave signal;
   delaying the square wave signal; and
   receiving the delay data; determining, according to the delay data, an output node of the square wave signal on a delay chain unit, obtaining a delayed square wave signal corresponding to the output node from the output node, and outputting the delayed square wave signal.

* * * * *